Patented Oct. 10, 1939

2,176,036

UNITED STATES PATENT OFFICE 2,176,036

MODIFIED ANTIOXYGENIC SALT

Sidney Musher, New York, N. Y., assignor to Musher Foundation Incorporated, New York, N. Y., a corporation of New York No Drawing. Application July 19, 1939,
Serial No. 285,353

9 Claims. (Cl. 99—150)

The present invention relates to the preparation of a new salt which possesses marked stabilizing and antioxygenic properties.

It is the purpose of the present invention to provide a new modified salt possessing marked stabilizing and antioxygenic properties which may be widely used to overcome oxidative deterioration of organic materials and particularly of oil containing food compositions.

A further object is the retardation of oxidative deterioration by simple and economical means through the use of this modified salt either as an additive product or in partial or complete replacement for ordinary salt normally used.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with this invention, there is preferably used the common salt either in its crude, partially refined or fully refined state, such salt being composed principally of sodium chloride.

In accomplishing the above objects, the salt is prepared with a minor amount of the water soluble and less preferably the alcohol soluble extracts of unbleached cereals and grains, which include principally oats, barley and yellow or white maize or hominy, and also less desirably include tapioca, rye, rice, wheat, buckwheat, etc. The cereals may, where desired be decorticated or degerminated before extraction. These cereals should not be sprouted, fermented, malted or boiled nor should their starch, protein or gluten be substantially converted, solubilized or gelatinized.

The preferred cereals are those which contain less than 0.75% total phosphorus and less than 10% of glyceride oil content and they are preferably in a fine state of division. The cereals and particularly the oat, maize and barley cereals, and desirably their meal portions, and preferably in unbleached condition and dry milled and finely divided, give the highest yield of stabilizing activity in comparison with the other cereals when utilized with salt.

The cereal may be dehulled but for normal commercial manufacture, the hulls may be allowed to remain as part of the cereal. The raw and unbleached by-products from the normal milling of these cereals are also included for extraction purposes.

The cereal such as finely divided whole oats should be mixed or agitated thoroughly with a quantity of water for 10 seconds to 1 hour. The water used should be substantially free of minerals and desirably free of iron and copper. Any quantity of water may be used to produce a free flowing mixture. For example, 1 part of oats may be mixed with 9 parts of water by weight. Other proportions may also be used such as from 5 to 25 parts of water to every 1 part of oats. The oat flour suspension should then be subjected to thorough agitation, preferably for a period of about 30 minutes.

It is desirable for the temperature of the water at the time of extraction to be about 135° F. although room temperature is also satisfactory. After a 30 minute agitation period the solution should desirably be cooled by placing it in a jacketed or coiled vat or by running water through cooling coils immersed therein so that the temperature of the water is reduced to from 70° F. to 100° F., and preferably to about 85° F.

It is not desirable for the extraction to be conducted at above 135° F. because of possibility of gelatinization of the starch present in the cereal at more elevated temperatures.

The solution thus cooled may then be treated to remove the undissolved starch, fibrous and other cereal portions. This may be accomplished by allowing the agitated mixture to settle for 2 to 12 hours or more until a clear supernatant liquor is formed which liquor is removed by decanting, siphoning or similar process.

The oat solution may also be subjected to a continuous centrifuging operation whereby all undissolved material is removed as a continuous operation.

The clear solution thus obtained should desirably be evaporated by vacuum distillation at not over about 135° F. under 25 inches of vacuum, to approximately 25% to 75% total solids and desirably to about 50% solids and to a Baumé of 23°.

The evaporating temperature may vary, dependent upon whether vacuum or atmospheric pressure is used. Although it is desirable to use vacuum evaporation, evaporation at atmospheric pressure may also be employed.

The extract thus obtained will be of dark brown or tan color, comparatively solid at 75° F. and liquid at 110° F., flowing freely at that temperature.

Extracts of other cereals will vary in color and consistency following extraction.

It is most desirable for purposes of extraction to use either an oat or a dry milled maize or hominy product as the cereal for extraction. Oats and maize will give an extract of substantially greater potency than the other cereals and the yield obtained will also be greater. In the case of oats, it is preferable to use finely divided whole oats with its full content of oat groats and hulls rather than oat flour. There may also less desirably be utilized the oat middlings and hulls or other residuary products obtained during the milling of the oats.

The extract thus prepared in concentrated form such as, for example, the concentrated water extract of unbleached yellow or white maize or hominy flour may be added to the salt by preferably spraying the extract on the salt crystals while they are kept at a temperature of about 180° F. and desirably between 250° F. and 300° F. so that the extract dries on the surface of the crystals of the salt.

For example, as the salt crystals leave the kiln at about 275° F., the water extract of maize flour containing, for example, 30% water may be heated to 170° F. and sprayed on the salt crystals.

The desired amount of the water extract may also be applied to the salt crystals and absorbed on the surface of the salt crystals at lower temperatures and then the salt containing the extract may be subjected to an elevated temperature such as to about 180° F. or above either at atmospheric pressure or under reduced pressure until substantially all of the moisture originally contained in the extract has been evaporated off.

Where the extract is first substantially dried to dryness, the subsequent drying out procedures are not necessary, but it is considered desirable in order to obtain complete absorption of the extract on the surface of the salt crystals for the salt to be subjected to a drying operation and for the extract that is applied to the salt to be applied in substantially moistened condition.

The amount of the cereal extract to be used on the salt will vary within fairly wide limits such as, for example, from about 0.02% of the cereal extract and 99.98% of the salt on their solids weight basis, to about 50% of the cereal extract and 50% of salt.

The amount of cereal extract and salt to be used will depend largely upon the degree of stabilizing activity desired and also upon whether or not a uniform crystalline structure is desired in the preparation of the salt and dependent upon the use to which the salt is to be put.

A minor amount of the cereal extract is preferred against the weight of the salt and preferably less than 5% of the cereal extract is used with 95% or more of the salt, on their solids weight basis. For example, it has been found that a particularly desirable combination can be made by using from 95% to 99.5% by weight of the salt with from 5% to 0.5% by weight of the cereal extract on its solids weight basis.

Salt as prepared in this manner will be markedly antioxygenic in character as compared with ordinary salt and even as compared with the cereal extracts themselves. Ordinary salt possesses no antioxygenic properties and in many cases shows definitely pro-oxygenic tendencies. When utilizing the extract-salt combinations, there is obtained a marked enhancement in stabilizing activity which cannot be expected from the stabilizing activity of any of the individual component parts of this mixture.

It is not known whether an actual chemical combination takes place or whether it is merely an absorptive phenomenon which occurs at the surface of the salt crystals or whether there is an interaction of a catalytic nature which results in the marked enhancement of stabilizing and antioxygenic activity.

Although the salt containing the cereal extract has but little effectiveness when used with pure oils and fats such as with the essential oils, gylceride oils and hydrocarbon oils, it is extremely effective when used in aqueous materials and aqueous compositions which may contain oil globules in the discontinuous phase thereof. The presence of the salt-cereal extract combination in the continuous aqueous phase gives extremely marked protection to the fat phase although when added direct to the fat phase it is comparatively much less effective.

The salt-cereal extract combination may therefore be very desirably utilized in brining and curing operations and particularly in the brining and curing of meat products, such as bacon, hams, pork, mutton, fatbacks, etc., fishery products such as mackeral, sardines, salmon, tuna fish, fish livers, etc., fruits such as apples, peaches, pineapples, pears, olives, etc., and similar food compositions.

For such brining and curing operations, the salt cereal extract may be used in any desired proportion such as in an amount of from 2% of the salt-cereal extract combination to a fully concentrated solution of the salt-cereal extract in the water used for dissolving the salt and to be used in the brining operation. Where the salt-cereal extract combination is not dissolved in water but is used in dried form for the curing or brining treatments, it may be employed in an amount ranging from 0.05% to 50% against the weight of the food composition which is to be protected against oxidative deterioration although generally for curing and brining treatments, as little as 15% or less of the salt-cereal extract combination against the total weight of the fish, meat, or similar food composition will be sufficient to give desired antioxygenic protection.

When the salt-cereal extract combination is utilized in such brining operations, it is not only more effective than the ordinary untreated salt, but is, in addition, more effective than the original cereal flour from which the extract is removed.

In the case of salt or cured fishery and meat products such as salt mackeral, smoked herring, cured bacon, etc., the product may be held for a first curing period of up to 30 days in a brine or curing mixture containing the water extract and then completely repacked by washing off or otherwise removing all of the stabilizing salt-cereal extract material, and the protective effect will nevertheless be retained over the entire storage period. Repacking may, where desired, not be resorted to and the efficiency of the extract will in full be retained to a far greater degree than if the original unextracted cereal had been employed with salt instead of the extract.

*Example I*

Gutted herring having a fat content of 12% was salted in a concentrated brine at room temperature, additional salt being added at regular intervals to maintain the salt concentration, the old brine being replaced with fresh untreated brine after 25 days.

|  | Comments— | |
| --- | --- | --- |
|  | At end of 1 month | At end of 3 months |
| Herring packed in brine only. | Fishy | Rancid and putrid showing definite protein decomposition, inedible. |
| Herring packed in brine prepared from salt containing 10% of ground oats against the weight of the salt. | Slightly sour, no fishiness, cereal odor. | Slightly sour, fishy and rancid. |
| Herring packed in brine prepared from salt containing the water extract (later made into the brine) of 10% of ground oats against the weight of the salt. | Good | Slightly fishy, far better in odor and appearance than either of above. |

A distinct advantage in this treatment is that there is no substantial change in the color, odor or other appearance of the treated fish or meat as is observed when the unextracted cereal is employed with its full starch content and where the fibre and starch appear on the surface of the treated fish or meat product.

In addition, in connection with fatty fishery products which are subject to both protein and rancidity decomposition, the use of the unextracted cereal flours themselves in the brining thereof sometimes develops sour cereal odors which are very objectionable. When the extracts as described are employed, however, no such off odors develop. This is in addition to the much greater degree of protection obtained by the use of the extracts than by the use of the original unextracted cereals.

Cured meat products such as bacon, salt pork, sausage, etc., may similarly be treated using the salt-cereal extract combinations in a similar manner to that described for fishery products.

*Example II*

Mackerel fillets were prepared by splitting the mackerel so that one side could be treated and directly compared with the other side of the same mackerel left in untreated form. In this manner a number of mackerel fillets were cured with salt only and compared with the opposite sides of the mackerel which were cured with a mixture comprising 96% salt and 4% of the concentrated water extract of maize flour brought to a 40% solids concentration. In each case the fillets were held in the salt for 30 days at room temperature and were then repacked in fresh brine. The observations were made after the repacking period.

|  | After— | | |
| --- | --- | --- | --- |
|  | 1 month | 2 months | 3 months |
| Untreated fillets | Fishy, slightly rancid. | Rancid | Rancid and slightly putrid. |
| Treated fillets | O. K. | O. K. | Fishy, slightly rancid. |

In a similar manner, other meat and fishery products and such other materials as olives, fruits, vegetables, etc. may similarly be cured, the salt-cereal extract combination exerting its effectiveness particularly upon the fixed or essential oil present, although it is comparatively much less effective when added directly to the oil.

*Example III*

One lot of olives was cured with 70% against their weight of salt for a period of 20 days at room temperature. Another lot of the same olives was cured with 70% against their weight of a salt-cereal extract combination comprising 98.5% of salt and 1.5% of the dried water extract of yellow maize flour for 20 days at room temperature. Both lots of olives were then washed off and exposed to light at a temperature of 98° F. The lot brined with ordinary salt became badly rancid within about one-third the time required for the lot brined with the salt-cereal extract combination to become rancid.

During these curing operations, even though the salt-cereal extract combination is subsequently washed off or removed from the meat, fish, fruit or vegetable following the curing treatment, the protection against oxidative deterioration is nevertheless retained. Where the cereal extract is utilized without the salt for such curing operations, the extract is substantially much less effective and its is particularly when used in combination with the salt that the full effectiveness of the extract is obtained.

The salt-cereal extract combination may also desirably be utilized for addition to such other food compositions as egg yolks in order to protect such egg yolks against the development of fishy and rancid odors and flavors and also to reduce their deterioration in finished compositions in which the egg yolks may be used such as in bakery products, mayonnaise, salad dressings, etc.

The salt-cereal extract combination may also very desirably be utilized in the manufacture of butter. The salt-cereal extract combination is added directly to the churn and following the churning operation, adding from 0.05% to 3.5% by weight of the salt-cereal extract combination against the weight of the butter. Butter that is prepared in this manner is substantially stabilized against oxidative deterioration.

*Example IV*

Butter was churned from a 35% butterfat containing cream. To a portion of the butter there was added and thoroughly mixed in with it 3% by weight of salt with which salt had been combined 2% by weight of the concentrated water extract of yellow maize flour. To another batch of butter prepared from the same lot of cream was added 3% of ordinary salt. The butters were then set aside at 50° F. and scorings were made at regular intervals with the following results.

|  | Scored after— | | |
| --- | --- | --- | --- |
|  | 2 weeks | 4 weeks | 6 weeks |
| Butter with ordinary salt | 92 | 90.5 | 89.5 |
| Butter with treated salt | 92.5 | 91.75 | 91.25 |

The salt that is employed should desirably be free of metallic impurities in order to avoid offsetting the antioxygenic properties of the cereal extract.

*Example V*

To a purified salt after leaving the kiln and while the salt was at approximately 275° F., there was sprayed on the salt 7% of the concentrated water extract of finely divided whole oats, which extract contained 40% total solids. This extract at the time of spraying was held at 130° F. so that it was completely fluid and the spraying was done in such manner as to disperse the extract evenly over the salt crystals. The salt was then set aside for a period of 30 days at room temperature along with samples of salt prepared from the same batch but which did not contain any of the water extract. These salts were used in the curing of mackerel in the same manner as referred to in Example II.

Observations were made on the fillets after the repacking period as indicated below:

After 2 months

Fillets prepared with untreated salt _____ Noticeably rancid.

Fillets prepared with treated salt _____ In very good condition, not rancid.

In place of water as the solvent for extracting the antioxygens from the unbleached cereals and for combination with salt there may less desirably be employed other similar solvents and particularly the alcohols including methyl, ethyl, butyl and propyl alcohols, glycerol, the glycols and glycol ethers and other solvents having the formula XOH where X is a low molecular weight aliphatic group.

Such alcohol soluble extracts are prepared by immersing the finely divided unbleached cereal in from 3 to 10 times its weight of alcohol or similar solvent and agitating vigorously while holding preferably at a slightly elevated temperature, as at 100° F. The alcohol soluble portion is then removed by filtration, siphoning, etc., and the alcohol removed preferably under reduced pressure and at a low temperature as at about 135° F. Such alcohol soluble extracts are combined with salt in the foregoing manner.

Among the cereals, there are included for water and alcoholic extraction and for combination of such extracts with salt, the cereal germs, and other cereal by-products, such as corn germ, wheat germ, rice germ, rice polish, etc. These materials are preferably utilized in finely divided, unbleached condition and may, where desired, be deoiled or defatted by expressing or extracting the fixed glyceride oil therefrom after which they are finely divided and subjected to water or alcoholic extraction and absorbed upon salt.

Although the cereals are particularly desired for extraction in accordance with this invention, the unbleached seeds, nuts and fruits, referred to herein as "seeds", and particularly the finely divided unbleached seeds, nuts and fruits, such as, for example, sesame, cottonseed, peanuts, soya, sunflower, olives, etc., which have desirably first been substantially deoiled or defatted by expression or extraction (as with hexane or gasoline) of the fixed glyceride oils contained therein may be utilized for combination with and absorption upon salt crystals in order to produce antioxygenic materials particularly valuable for use in retarding oxidative deterioration of food compositions.

The salt prepared in this manner may also be utilized in the curing of hides and leather and similar compositions which contain oxidizable oils or oxidizable protein materials whereby such materials may be substantially protected against oxidative deterioration.

It is important that when the antioxygens are extracted from the cereals or other materials by water, or less preferably by alcohol, that the antioxygenic substances be in substantially the same chemical condition as in the original materials when extracted. Moreover, the temperature, acidity and components of the extracting liquor should not be such as to cause substantial change or breakdown in the antioxygenic complexes which are removed.

Boiling, fermentation, malting, sprouting, peptinizing, causticizing, dextrinizing, strong acidification, etc., are desirably avoided in the extraction procedures.

The extract itself contains usually both low and high molecular weight water soluble carbohydrates and also soluble organic nitrogen and phosphorus compounds, all of which are present in complex combinations and appear to be essential to obtain the desired action and are activated or enhanced by absorption upon the salt and also by heating in the presence of the oxidizable organic composition to above 200° F. and desirably over 250° F.

This application is a continuation in part of applications Serial Numbers 229,296 filed September 10, 1938, and 249,990 filed January 9, 1939.

Having described my invention, what I claim is:

1. An antioxygenic salt preparation consisting of a major proportion of common salt and a minor proportion of the concentrated substantially starch free and fibre free water soluble antioxygens extracted from finely divided unbleached cereals.

2. In intimate combination with an organic product susceptible to oxidative deterioration to retard such deterioration, a relatively small amount of an antioxygenic salt preparation consisting of an intimate mixture of a crystallized salt and the cereal antioxygens extracted from finely divided unbleached cereals by the use of a solvent selected from the group consisting of water and alcohol, said antioxygens being substantialy free of fibres and starch.

3. An antioxygenic crystallized salt preparation to be added in relatively small proportions to organic products susceptible to oxidative deterioration to stabilize them against such deterioration, said crystallized salt preparation containing a minor proportion of the antioxygens extracted with a solvent selected from the group consisting of water and alcohol from a flour selected from the group consisting of the finely divided unbleached cereals, cereal germs and seeds.

4. An antioxidant combination comprising a crystallized salt carrying water soluble cereal antioxygens extracted from finely divided unbleached cereals, said antioxygens being substantially devoid of starch and cereal fibres.

5. A process of preparing an antioxidant mixture for addition in relatively small quantities to organic materials susceptible to oxidative deterioration to retard such deterioration, said process comprising mixing a finely divided unbleached cereal in a relatively large volume of water, continuing the mixture of the water and the cereal until the water soluble antioxygens in said cereals have been substantially taken into solution, removing the undissolved starch and fibrous cereal residues, concentrating the antioxygenic water soluble solution and combining said antioxidants in concentrated form with a relatively large quantity of a salt material.

6. A process of making an antioxidant preparation for addition in relatively small quantities to food materials subject to oxidative deterioration, to retard such deterioration, such process comprising mixing a flour selected from the group consisting of the unbleached finely divided cereals, cereal germs and seeds with a relatively large volume of a solvent selected from the group consisting of water and alcohol, followed by removal of the fibrous residues, concentrating the fibre-free antioxygenic solution that is thus obtained by removal of the solvent, mixing the concentrated solution containing the antioxygens extracted from the unbleached flours with salt, and then removing the balance of the solvent to produce a dry antioxygenic salt preparation.

7. A stabilized organic material containing a highly active antioxygenic salt preparation consisting substantially of a major proportion of salt and a minor proportion of the antioxygens present in the flours selected from the group consisting of the unbleached finely divided cereals, cereal germs and seeds, the antioxygens having been extracted from said flours by the use of a solvent selected from the group consisting of water and alcohol and said antioxygens being substantially devoid of insoluble cereal residues.

8. A process of stabilizing an organic material susceptible to oxidation which comprises forming a combination of a major proportion of salt and a minor proportion of the antioxygens present in flours selected from the group consisting of the finely divided unbleached cereals, cereal germs and seeds, said antioxygens being extracted from said flours by the use of a solvent selected from the group consisting of water and alcohol and said antioxygens being substantially devoid of fibres and starch, mixing the combination with the organic material susceptible to oxidation whereby said material is substantially stabilized against oxidation.

9. An antioxygenic salt preparation consisting of a major proportion of common salt and a minor proportion of the concentrated substantially starch free and fiber free water soluble antioxygens extracted from maize.

SIDNEY MUSHER.